Jan. 28, 1969   D. HUMPHERSON   3,424,089
CARTRIDGE CASES

Filed June 20, 1966   Sheet _1_ of 4

INVENTOR
DONALD HUMPHERSON

By Cushman, Darby & Cushman
ATTORNEYS

United States Patent Office 3,424,089
Patented Jan. 28, 1969

3,424,089
CARTRIDGE CASES
Donald Humpherson, Great Barr, Birmingham, England, assignor to Imperial Metal Industries (Kynoch) Limited, Witton, Birmingham, England, a corporation of Great Britain
Filed June 20, 1966, Ser. No. 558,745
Claims priority, application Great Britain, July 8, 1965, 29,008/65; Feb. 3, 1966, 4,805/66
U.S. Cl. 102—43
Int. Cl. F42b 7/06
3 Claims

ABSTRACT OF THE DISCLOSURE

A plastics cartridge case is made by fitting an extruded length of plastics tube into a mold and injection molding a plastics head portion onto one end of the tube. The end of the tube may be first rolled inwardly to form a lip so that a mechanical connection is formed between the tube and the head.

The molding apparatus includes an annular cavity for receiving the plastics tube, means for injecting plastic into one end of the tube and sealing means for preventing the injected plastic from filling the tube.

---

This invention relates to cartridge cases and, in particular, to plastics cartridge cases and methods and apparatus for their production.

According to one aspect of the present invention, a plastics cartridge case comprises a tubular body portion and a head portion, wherein the tubular body portion comprises a plastics material which has been subjected to an orienting process to increase its tensile strength, and the head portion comprises a moulded plastics material located at one end of and secured to the tubular portion. By "secured" we mean a connection which is strong enough to withstand forces tending to separate the head and body portions on firing the cartridge.

Preferably the end of the tube at which the head portion is located is turned inwardly to form a lip which encompasses the rim of the head portion.

Preferably also the lip is located at least partly within the moulded head portion.

Either a bond between the moulded plastics material and the tubular portion at least assists in securing them together, or, in the case of the lip located at least partly within the moulded head portion, the mechanical interlock between the lip and the moulded head portion secures the moulded plastics material to the tubular portion.

Preferably further the tubular body portion is made from a polyolefine which has been biaxially stretched at a temperature below its crystallite melting point, but a similar material which has been stretched in the direction of one of its major axes only may be satisfactory for certain applications.

Examples of suitable polyolefins are polymers based on ethylene or copolymers based substantially on ethylene, having densities from 0.94 to 0.96 g./cc. and melt flow indices not greater than 0.5.

The head portion may be moulded from a plastics material having the same chemical composition as that of the tubular portion, provided that it possesses the desired moulding characteristic, but it may be desirable for some purposes to use a plastics material which possesses more rigidity and strength in its "as moulded" condition, in order to increase the firing sensitvity of the loaded cartridge and help the cartridge case to withstand the mechanical strain imposed on it by the ejector mechanism, should it be fired from an automatic weapon.

Polymers and copolymers of ethylene having densities from 0.940 to 0.960 g./cc. and melt flow indices not greater than 3.5 may be used to mould the head portion, preferably the density should be from 0.955 to 0.960 g./cc. and melt flow index not greater than 1.0. Examples of plastics materials which possess suitable rigidity, as moulded, are polymers and copolymers based on propylene, acrylonitrile/butadiene/styrene (ABS) copolymers, nylon and acetal polymers and copolymers. Mouldable reinforced plastics may also be used, e.g., glass-filled nylon.

According to another aspect of the invention a method of producing a plastics cartridge case comprises taking a length of a tube of a plastics material which has been subjected to an orienting process to increase its tensile strength, and moulding a plastics head portion on to one end thereof, so that the tubular portion and head portion are secured together.

Preferably the temperature of moulding is such that the head portion is secured by a mechanical interlock only with the lip and thus the tubular portion.

According to yet a further aspect of the invention, an apparatus for producing a plastics cartridge case comprises a mould having a cylindrical cavity, an elongate core member of circular cross-section, which is locatable coaxially within the mould cavity to form an annular gap between mould and core into which a plastics tube may be inserted, the cavity extending beyond the core at one end, means to inject molten plastics material into that part of the mould which extends beyond the core and annular sealing means cooperable with an annular region of the wall of the plastics tube and the core to prevent molten plastics material from flowing into the tube beyond said annular region.

In order that the invention may be more clearly understood, it will be illustrated by way of example only by the following embodiments with reference to the accompanying drawings, in which.

Figure 1:
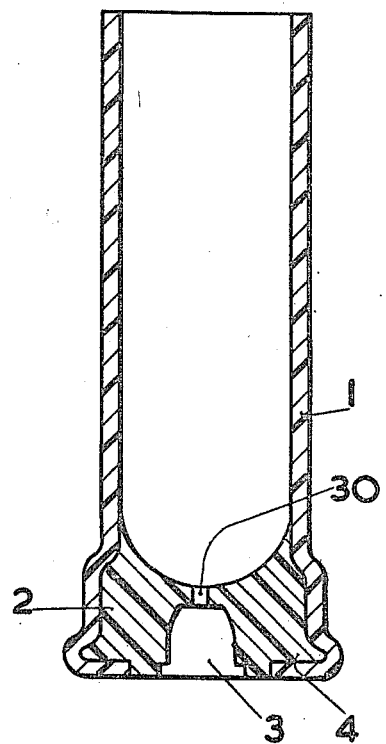
FIGURE 1 is an axial section through a plastics cartridge case in accordance with one embodiment of the invention.

Referring to FIGURE 1, the cartridge case shown comprises an extruded plastics tube 1 and a moulded plastics head 2. The tube 1 was cut from tube stock comprising extruded polyethylene tube, of density 0.955 g./cc. and melt flow index 0.2, which had been biaxially oriented below its crystallite melting point to increase its tensile strength in the longitudinal direction to 16,000 p.s.i. and in the circumferential direction to 5,500 p.s.i. The head 2, including an integral cap chamber 3 and a circumferential rim 4, was then injection moulded into one end of the tube 1, as described in detail below, and secured to said one end by a connection which is strong enough to withstand forces tending to separate the head and body portions on firing the cartridge.

Figure 3:
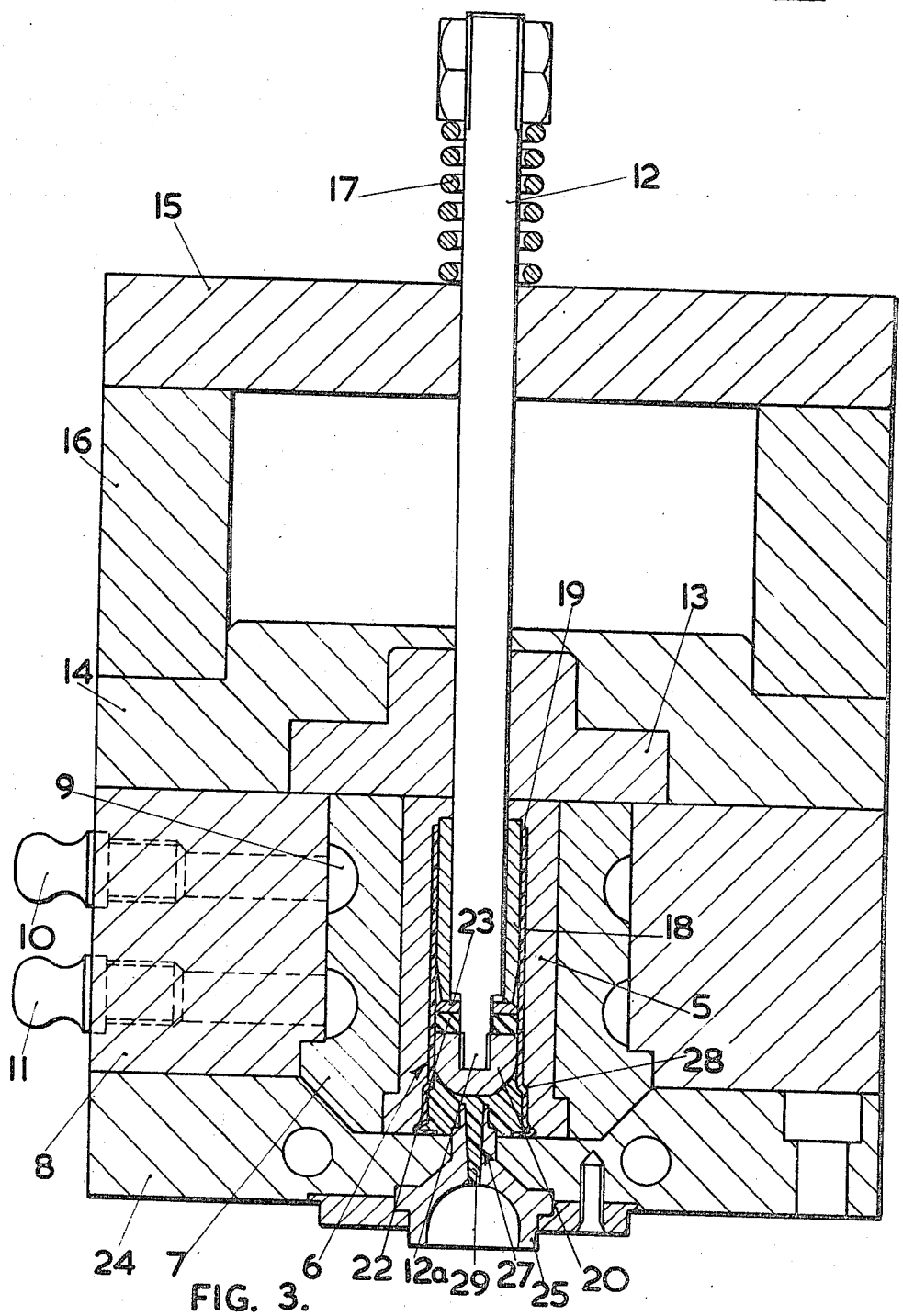
FIGURE 3 is a section through one embodiment of a mould assembly for fitting in an injection moulding machine to produce the case shown in FIGURE 1.

Referring now to FIGURE 3, a mould 5 having a stepped cylindrical cavity 6 is fitted within a mould block 7 which is mounted in an annular bolster 8. Cooling channels 9, bounded by the block 7 and the bolster 8, are provided with inlet and outlet tubes 10, 11 through which coolant can be circulated.

An ejector bar 12 is slidably mounted in a front bearing 13 located in a backing plate 14, and in a back bearing plate 15 which is secured to the backing plate 14 through a spacer 16, to enable the bar 12 to move between a retracted position (as shown) and an ejecting position in which it protrudes from the open end of the mould cavity 6. The bar 12 is biassed to its retracted position by a compression spring 17.

An annular core pin 18 is fitted into the mould cavity 6 and is held in place by a step 19 in the base of cavity 6; when the core pin 18 is in position it defines an annular cavity with the mould 5. The bar 12 is a sliding fit within the bore of the core pin 18.

A doomed core head 20 is screwed on the necked end 12a of the bar 12 so as to retain a sealing washer 22 of compressible material and a steel compression washer 23 in position on said necked end 12a. The washers 22 and 23 are slidable on the necked end 12a, so that movement of the bar 12 in the retracting direction causes the washer 23 to engage the end of the core pin 18 and further movement of the bar 12 causes the sealing washer 22 to be compressed between the washer 23 and the core head 20, thus causing radial expansion of the washer 22.

The open end of the mould 5 is closable by means of a sprue plate 24 which is mountable in engagement with the sprue bush 25 and injection nozzle 26 of a plunger-type injection moulding machine (not shown). The nozzle 26 projects into the mould cavity 6 when the sprue plate 24 is in its mould-closing position. The profile of the nozzle 26 is made to correspond with the internal dimensions of the cap chamber 3 (see FIGURE 1) of the finished cartridge case. In use, the sprue plate is secured rigidly to the injection moulding machine and the rest of the mould assembly is mounted for axial movement away from and towards the sprue plate. Such movements are hereinafter referred to respectively as opening and closing the mould.

Cartridge cases according to the invention were produced, as follows, using the above-described mould assembly after fitting it in a standard type injection moulding machine.

Figure 2:
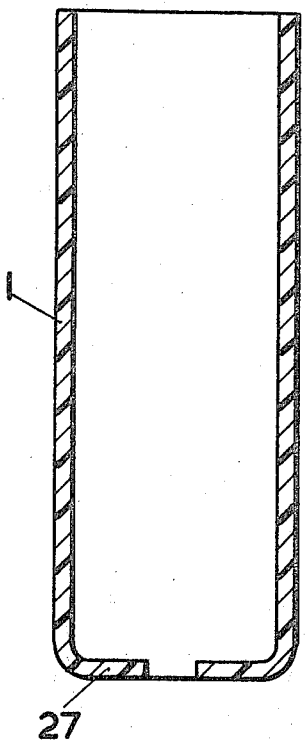
FIGURE 2 is a section through a cut length of plastics tube before moulding.

The mould was opened and a cut length 1 of biaxially oriented polyethylene tube having one end rolled inwardly to form a lip 27 (see FIGURE 2) was inserted into the mould cavity 6 so that the leading end of the tube 1 was held between the core pin 18, the core head 20 and the wall of the mould cavity 6. The mould was then closed and molten polyethylene having a density of 0.960 g./cc. and a melt flow index of 0.9 was injected into the mould cavity 6 via the sprue bush 25 and nozzle 26. The molten plastics material filled that part of the cavity 6 beyond the core head 20, forcing the wall of the tube 1 into the stepped portion 28 of the mould, and then forced the core head 20 towards the core pin 18 causing the sealing washer 22 to expand radially against the wall of the tube 1 as previously described. This effectively prevented molten plastics material from passing up the tube 1 beyond the washer 22. The mould was allowed to cool under the influence of the coolant circulating through the channels 9 and was then opened and the cartridge ejected by axial movement of the bar 12.

The injection moulding details were as follows:

| | | |
|---|---|---|
| Rear injection cylinder temperature | °C | 210 |
| Front injection cylinder temperature | °C | 225 |
| Nozzle temperature | °C | 205 |
| Plunger pressure | p.s.i. | 13,500 |
| Injection cycle time | seconds | 45 |
| Cooling cycle time | do | 15 |

A relatively long injection cycle time is used to minimise the effects of shrinkage of the moulded material.

The cartridge case, as ejected, carried a sprue 29 of moulded polyethylene. This was removed by a punch tool which produced the flash hole 30 (see FIGURE 1) in the same operation.

It will be seen that cases produced as described above have a profile similar to that of the traditional case having a metal head and a paper or plastics tube. Thus they may be fitted securely into the breach of a normal shotgun.

Figure 5:
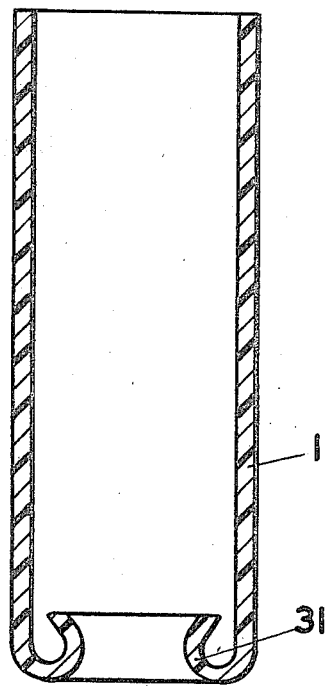
FIGURE 5 is a section through a cut length of plastics tube used to make the case of FIGURE 4.
Figure 4:
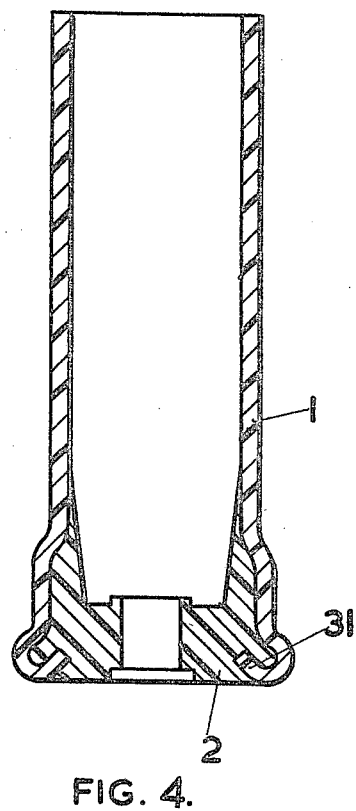
FIGURE 4 is an axial section through a plastics cartridge case in accordance with another embodiment of the invention.

Referring to FIGURES 4 and 5, the cartridge case shown comprises an extruded plastics tube 1 and moulded plastics head 2. The tube 1 was cut from tube stock comprising extruded polyethylene tube, of density 0.955 g./cc. and melt flow index 0.2, which had been biaxially oriented at a temperature below its crystallite melting point to increase its tensile strength in the longitudinal direction to 15,000 p.s.i. and circumferential direction to 5,300 p.s.i. The lip 31 was then formed on one end of tube 1 by using a "turnover chuck" of the type commonly used to form the roll turnover on a paper cartridge case.

The prepared tube 1, i.e., having the lip 31, was then placed in the mould of an apparatus as shown in FIGURE 3, the mould was closed and molten polyethylene having a density of 0.96 g./cc. and a melt flow index of 0.9 was injected into it, using an injection time of 45 seconds and a cooling time of 15 seconds. After sprue removal, the resultant cartridge case was as shown in FIGURE 4.

The actual profile of the lip 31 is not critical; but it is important that the inner edge of the lip of the prepared tube should not touch the inner wall of the tube, so that molten plastics material is able to flow on both sides of the lip during the injection moulding of the head, however, the temperature conditions are important because it is preferable that no bonding occurs between the head 2 and the tube 1. Thus a mechanical interlock is produced between the lip 31 and the head 2, and the wall of the tube 1 is able to lift away from the head 2, for example during the pressure conditions existing when firing takes place. Consequently it has been found that there is a lesser likelihood of failure in the tube wall just above the uppermost part of the head 2.

Figure 6:
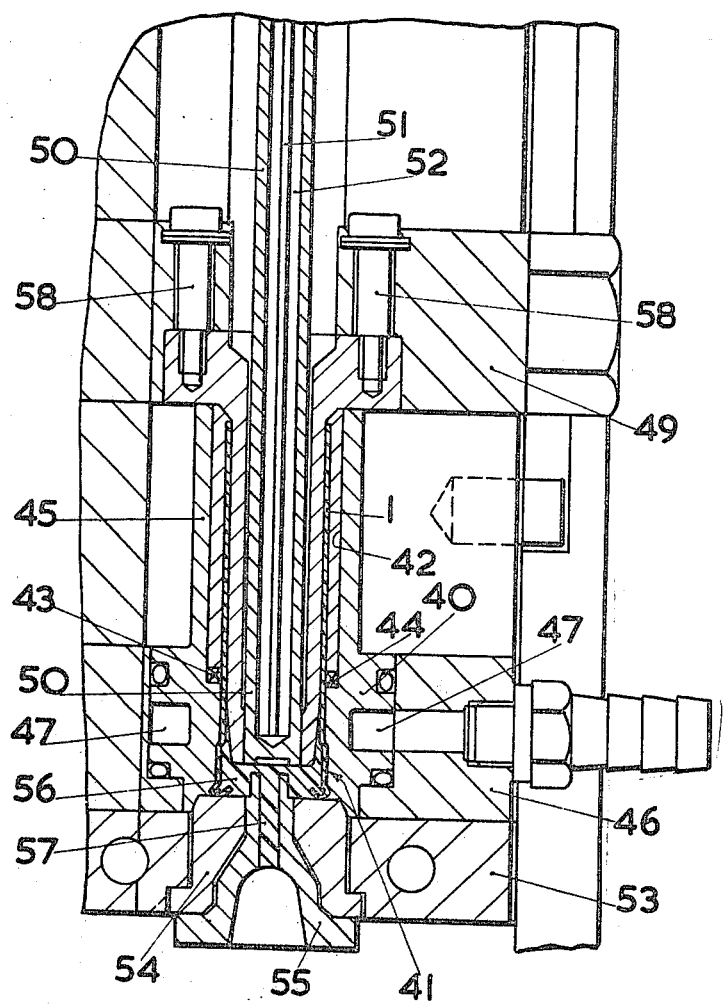
FIGURE 6 is a section through another embodiment of a mould assembly for fitting in an injection moulding machine to produce the case shown in FIGURE 4.

The mould assembly shown in FIGURE 6 can be used to produce the cartridge case of FIGURE 4 from the tube of FIGURE 5 with solely a mechanical interlock between the tube 1 and the head 2.

Referring to FIGURE 6, the mould assembly shown therein is basically the assembly of FIGURE 3 with the principal modification of re-arrangement of the sealing means for preventing excessive flow of the injected plastics along the tube 1. The assembly comprises a mould 40 having a cavity which is stepped in the vicinity of its entrance 41 and conforms with the external shape of the case of FIGURE 5, and which is counterbored at 42. The counterbore 42 houses a square section annular washer 43 against the end 44 of the counterbore, and a slidable sleeve 45 of length slightly greater than the difference between the lengths of the counterbore 42 and the washer 43.

The mould 40 is fitted in a mould block 46 and defines therewith a conduit 47 for coolant.

An axially bored core member 48 is secured by bolts 58 to a block plate 49 which is movable relative to the mould 40 and mould block 46 to project the core member 48 into the mould cavity and close the counterbored end thereof. The annular clearance between the core member 48 and facing surface of the sleeve 45 is just sufficient to receive the tube 1.

The bore of the core member 48 is provided with an ejector rod 50 having a coolant circulation tube 51 and channel 52. The ejector rod 50 is movable relative to the core member 48 between the retracted position shown in FIGURE 6 and an ejection position projecting beyond the core member 48 and stripping the case from the member 48 and out of the mould 40.

In use the mould assembly of FIGURE 6 is mounted on a reciprocating screw injection moulding machine which may actually contain up to twenty-four such assemblies. The back plate 49, which is common to all of the assemblies, is spaced away from the common mould block 46 to permit the sleeve 45 to project from the block 46, and the washer 43 to return to its square section. The tube 1 of FIGURE 5 is then inserted through the entrance 41 of the mould 40 and slides over the core member 48 to the greatest possible extent, as shown in FIGURE 6. The back plate 40 is then moved to the position shown in FIGURE 6, returning the sleeve 45 into the counterbore 42 and thereby compressing the washer 43 axially and causing radially inward expansion thereof. Thus the plastics tube 1 is pressed tightly against the core member 48 to produce a seal preventing further penetration of injected plastics along the tube 1, whilst protecting the washer 43 from the action of the molten plastics.

Finally the entrance 41 of the mould 40 is closed by a sprue plate 53 mountable in engagement with the sprue bush 54 and injection nozzle 55 of the injection moulding machine, and molten plastics is injected to expand the tube 1 and form the head 56 and sprue 57 shown in FIGURE 6.

In this embodiment, the injection cylinder temperatures at four zones from a feed hopper, and the other moulding data are as follows:

| | |
|---|---:|
| Zone 1 _____°C__ | 175 |
| Zone 2 _____°C__ | 190 |
| Zone 3 _____°C__ | 190 |
| Zone 4 _____°C__ | 195 |
| Nozzle temperature _____°C__ | 210 |
| Mould sprue plate _____°C__ | 70 |
| Mould cavity plate _____°C__ | 20 |
| Plunger pressure _____p.s.i__ | 9,600 |
| Injection cycle time _____seconds__ | 45 |
| Cooling cycle time _____do____ | 15 |

Generally speaking it is preferable for the pressure to be high, to form the tube into a sharply defined head and rim and the temperatures used to be such that no bonding takes place between the tube 1 and the head 2.

Plastics cartridge cases manufactured in accordance with the embodiment, i.e., by the mould assembly of FIGURE 6 and as described with relation to FIGURE 4, were tested for the strength of the mechanical interlock between the tube 1 and the head 2. Forty of the cases formed batch No. 1 and were loaded at 3–3¼ tons/square inch, another forty formed batch No. 2 and were loaded at 2½ tons/square inch, and a further forty formed batch No. 3 and were also loaded at 2½ tons/square inch.

Batch No. 3 were fired at ambient temperatures in a standard weapon and were all successful, there being no failure of the interlock, and batch No. 2 were fired at ambient temperatures in a weapon with an over-sized breech, and there were no failures. To provide a very severe test, batch No. 1 was stored overnight at −20° C. and then immediately fired in the weapon with the over-sized breech. No failures resulted.

Instead of the external shaping of the cartridge case shown in FIGURES 1 and 4, a generally tapering shape can be used.

I claim:

1. A plastics cartridge case comprising a tubular body portion and a head portion, wherein the tubular body portion comprises a plastics material which has been subjected to an orienting process to increase its tensile strength, and the head portion comprises a plastics material separately injection molded in situ within one end of the tubular body portion, said one end having an inwardly turned lip encompassing of the head portion and located at least partly within the head portion to provide a mechanical interlock between the lip and the molded head portion to secure the molded plastics material to the tubular body portion and to effect a gas-tight seal between the head and tubular body portions.

2. An apparatus for producing a plastics cartridge case comprising a mould having a cylindrical cavity, an elongate core member of circular cross-section, which is locatable co-axially within the mould cavity to form an annular gap between mould and core into which a plastics tube may be inserted, the cavity extending beyond the core at one end, means to inject molten plastics material into that part of the mould which extends beyond the core and annular sealing means co-operable with an annular region of the wall of the plastics tube and the core to prevent molten plastics material from flowing into the tube beyond said annular region, said sealing means comprising a washer of compressible material located between two parts of the core which are mounted for relative axial movement so that pressure of the molten plastics material on the leading end of the core causes axial compression of the washer, its consequent radial expansion serving to bring its edge into sealing contact with the inner wall of the annular region of the tube.

3. An apparatus for producing a plastics cartridge case comprising a mould having a cylindrical cavity, an elongate core member of circular cross-section, which is locatable co-axially within the mould cavity to form an annular gap between mould and core into which a plastics tube may be inserted, the cavity extending beyond the core at one end, means to inject molten plastics material into that part of the mould which extends beyond the core and annular sealing means co-operable with an annular region of the wall of the plastics tube and the core to prevent molten plastics material from flowing into the tube beyond said annular region, said sealing means comprising a washer of compressible material located between two parts of the mould which are arranged for relative axial movement so that closing of the mould causes axial compression of the washer, the consequent radially inward expansion of its radially inner surface pressing the annular region of the wall of the plastics tube inwardly to seal the inner wall of said region against the core.

References Cited

UNITED STATES PATENTS

| | | | |
|---|---|---|---|
| 2,915,972 | 12/1959 | Hitchens et al. | 102—42 |
| 3,103,170 | 9/1963 | Covington et al. | 102—43 |
| 3,105,439 | 10/1963 | Young | 102—43 |
| 3,127,837 | 4/1964 | Lockwood | 102—42 |

FOREIGN PATENTS

| | | |
|---|---|---|
| 995,100 | 10/1951 | France. |
| 1,095,837 | 12/1954 | France. |

ROBERT F. STAHL, *Primary Examiner.*

U.S. Cl. X.R.

18—42, 45